United States Patent
Friggstad

(10) Patent No.: US 6,315,055 B1
(45) Date of Patent: Nov. 13, 2001

(54) DRAFT CABLE FOR CONNECTING A HITCH FRAME TO A WING SECTION OF AN AGRICULTURAL IMPLEMENT

(75) Inventor: Terrance A. Friggstad, Grasswood SK (CA)

(73) Assignee: Flexi-Coil Ltd., Saskatchewan (CA)

( * ) Notice: Subject to any disclaimer, the term of this patent is extended or adjusted under 35 U.S.C. 154(b) by 0 days.

(21) Appl. No.: 09/764,593

(22) Filed: Jan. 18, 2001

Related U.S. Application Data

(62) Division of application No. 09/426,370, filed on Oct. 25, 1999, now Pat. No. 6,223,831.
(60) Provisional application No. 60/106,155, filed on Oct. 29, 1998.

(51) Int. Cl.[7] .................................................. A01B 73/02
(52) U.S. Cl. ........................................ 172/459; 172/776
(58) Field of Search .................................... 172/311, 314, 172/313, 441, 440, 450, 452, 454, 455, 459, 502, 501, 634, 635, 662, 776

(56) References Cited

U.S. PATENT DOCUMENTS

| | | | |
|---|---|---|---|
| 3,643,742 | * | 2/1972 | Wellendorf .......................... 172/316 |
| 3,960,221 | * | 6/1976 | Blair et al. ........................... 172/311 |
| 4,042,045 | * | 8/1977 | Hake ................................... 172/311 |
| 4,056,148 | * | 11/1977 | Blair .................................... 172/311 |
| 4,113,028 | * | 9/1978 | Glueck . | 
| 4,612,997 | * | 9/1986 | Wilkins ................................ 172/776 |
| 4,813,489 | * | 3/1989 | Just et al. ............................ 172/175 |
| 4,893,682 | * | 1/1990 | Smallacombe ...................... 172/311 |
| 5,029,757 | * | 7/1991 | Bourgault et al. .................... 239/167 |
| 5,129,218 | * | 7/1992 | Youngberg et al. ................. 56/15.8 |
| 5,251,704 | * | 10/1993 | Bourgault et al. .................... 172/311 |

* cited by examiner

Primary Examiner—Christopher J. Novosad
(74) Attorney, Agent, or Firm—John William Stader; Larry W. Miller

(57) ABSTRACT

The invention disclosed is a support for a draft cable in a multi-sectional agricultural tillage apparatus movable between an open operating position and a folded transport position. The draft cable is attached to the central frame hitch and an outer wing, and is supported along its length by a folding support arm. A mechanical mechanism interconnects the outer wing with the support arm such that the cable moves to a non-interfering position when the tillage apparatus is in the transport position.

5 Claims, 10 Drawing Sheets

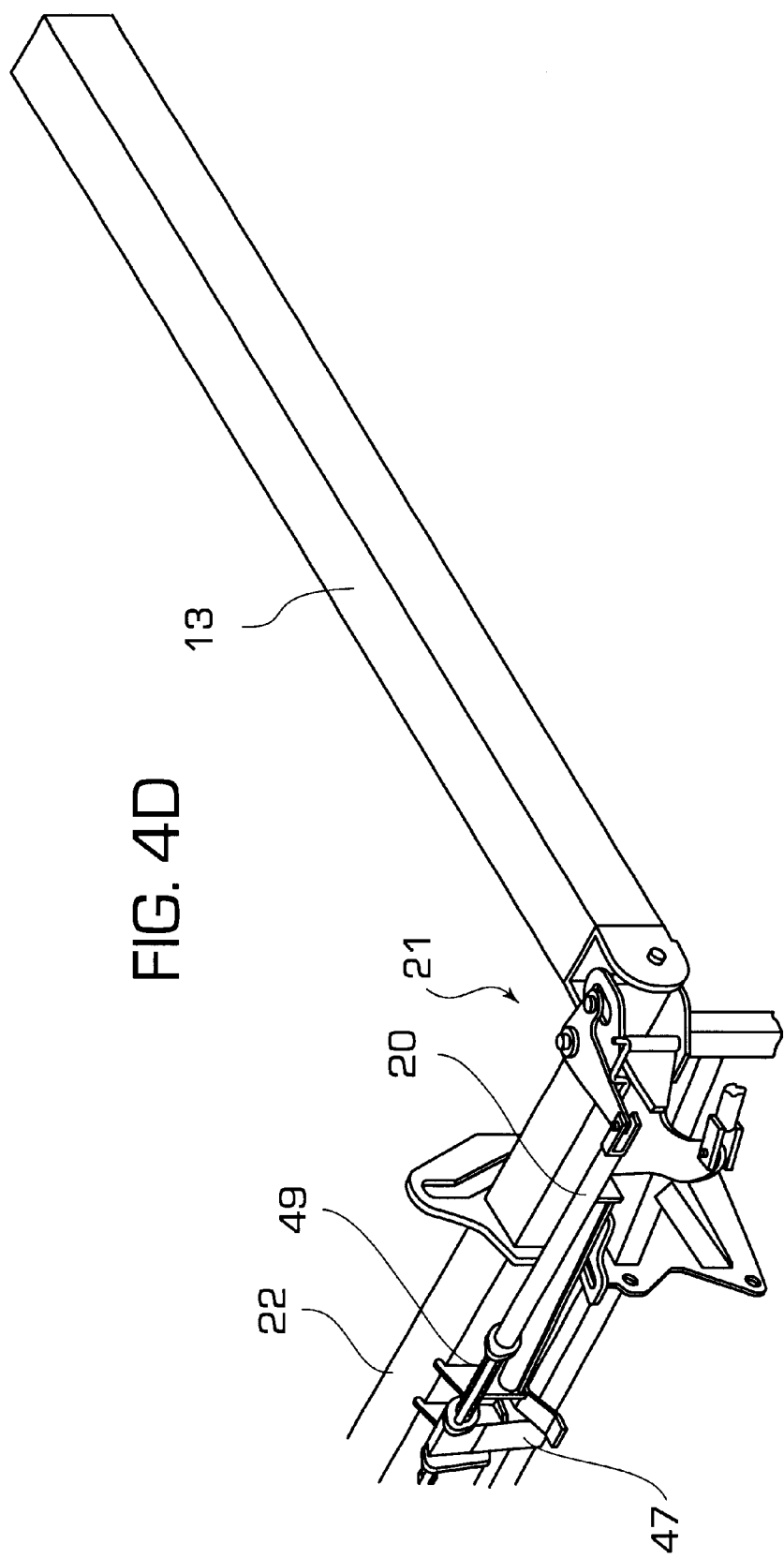

DRAFT CABLE FOR CONNECTING A HITCH FRAME TO A WING SECTION OF AN AGRICULTURAL IMPLEMENT

CROSS-REFERENCE TO RELATED APPLICATIONS

This application claims domestic priority on U.S. Provisional Patent Application Ser. No. 60/106,155 filed on Oct. 29, 1998. This is a divisional of U.S. Utility patent application Ser. No. 09/426,370 filed on Oct. 25, 1999, now U.S. Pat. No. 6,223,831 B1 issued on May 1, 2001.

BACKGROUND OF INVENTION

1. Field of Art

This invention relates to the improvement of an agricultural ground-working cultivator. More specifically it relates to an improvement of the center frame of a cultivator and support for a pair of opposing wings on the said cultivator.

2. Description of Prior Art

The need to till and cultivate soil for the planting of crops has been accomplished since the earliest days of civilization. More recently, tillage devices have increased in complexity and size, depending on the type of crops, quantity and soil being tilled. There has also been an increased emphasis on conserving natural resources resulting in these concerns being integrated in modem tillage systems. These concerns have resulted in larger and more complex tillage systems that assist in achieving these goals. A larger tillage system allows a single operator to perform tillage operations on a greater area. More sophisticated tillage systems further allow for the accomplishment of low till and no till farming techniques. Low till and no till farming encourages tilling, planting and fertilizing in a single pass of the tillage device or cultivator through the field. By only disturbing the soil a single time, there is less soil compaction, less moisture loss, less pesticides and herbicides needed and less fertilizer required. However, these larger and more complex tillage systems create complexities that were previously unknown in the art.

Previously, an agricultural tractor could pull a relatively small tillage device or cultivator. As the tillage device or cultivator moved over hills and similar undulations in the terrain all the ground-working implements maintained contact with the soil. The width of the tillage device was sufficiently small such that it generally did not have problems maintaining ground contact. However, as the tillage devices were increased in width, so as to be able to till a greater area in a single pass, the undulations in the ground resulted in the ground-working tools failing to always contact the earth. Also, to transport the tillage device or cultivator for the farming operations it was also necessary for the device to be capable of being collapsed to a width sufficient to be moved. To accomplish these goals, a center section with a set of pivotable wings was designed. The wings could pivot horizontally relative to the center section allowing the tillage device to accommodate some undulations in the ground. The wings could also be folded into the center section allowing for easy transport before and after farming operations. Eventually, an outer set of wings was added increasing the width of the tillage device. FIG. 1 illustrates the general configuration of a tillage device or cultivator. Specifically, there is a center section directly behind the tractor. There is a set of inner wings and outer wings respectively surrounding the center section. Some cultivators are folded into the transport position along an axis along the direction of travel; other cultivators are folded along a diagonal axis. In prior art cultivators, the wings can rotate on an axis in the direction of travel, the wings generally cannot rotate, flex or bend on an axis perpendicular to travel. Finally, the additional inner wings and outer wings create large additional draft forces on the frame of the cultivator. (Draft forces are the forces created when the ground-working tool is pulled through the soil.) These are complex problems to overcome, especially when considering the need for the tillage device to be a collapsed from its field operation mode to the compact transportation mode.

Consequently, the need exists for a linkage, which allows for the inner wings to move perpendicular relative to the center section of a tillage device. Also the need exists for a draft cable which helps distribute the draft load generated by the outer wings.

OBJECTS OF THE INVENTION

It is an object of the present invention to provide a differential connecting rod for the present invention.

It is a further object of the present invention to provide a draft cable to support the outer wings.

It is a further object of the present invention to provide a joint having 3 axes of freedom for connecting the wing sections to the center section about a transverse axis longitudinal to the drawbar in the field operating position.

It is a further object of the present invention to provide a differential connecting rod, which allows the wings to be moved into a transportation mode.

It is a further object of the present invention to provide a draft cable, which can be moved to a stowed position during the transportation mode.

It is a further object of the present invention to provide a differential connecting rod, which has a transport assembly, which is used to prevent wing movement when the tillage device is in transportation mode.

It is a further object of the present invention to provide a differential connecting rod that can be adjusted.

It is a further object of the present invention to provide a differential connecting rod that can be moved 90 degrees to allow for stowage during the transportation mode.

It is a further object of the present invention to provide an inexpensive means for providing draft support to the outer wings of the tillage device.

SUMMARY OF THE INVENTION

The invention overcomes the deficiencies of the prior art. The invention controls the movement of the inner wings which surround the center section of a cultivator or tillage device. The invention also prevents damage to the universal joint that connects the inner wing frame to the center frame. The invention also consists of a folding draft support wire which transfers a portion of the draft force exerted on the outer wings to the center hitch frame of the cultivator.

The present invention is accomplished a differential control rod that is parallel to the center frame. The center frame is typically connected to the inner wing frame by a universal joint. The present invention is a modified universal joint that is attached to the center frame by a spherical bearing and pivot allowing for a $3^{rd}$ axis of movement. The pivot is positioned inside a slot on a bracket. An 'L'-shaped linkage controls the movement of the pivot within the slot. The linkage is pivotally attached to the center frame and differential bar. A spring assembly supports the center of the differential bar. The spring assembly biases the pivot in the slot to a center position. When the cultivator wings are moved to the side and rotated into the transportation position, the tongue in the transport assembly is inserted between the rods. This holds the rods and prevents damage to the slot and universal joint during transport.

The folding draft support wire is a means by which the draft force on the outer wings is transferred to the center hitch frame. The wire is pivotally attached to the outer wing and wing hitch frame. Supporting the wire is a folding support arm. The arm has an outer arm pivotally attached to an inner arm. The inner arm is attached to the wing hitch frame. Controlling the outer arm is a chain that is attached to the wing hitch frame by a chain arm. The chain is also attached to an elongated plate on the outer arm. This design allows the support arm to be folded when the cultivator is in the transportation mode.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4D is a side, front view of the transport assembly.

DETAILED DESCRIPTION OF THE INVENTION

Figure 4A:
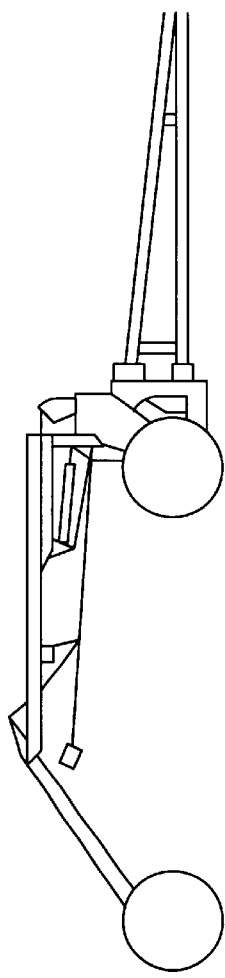
FIG. 4A is a side view of the cultivator in the headland mode.
Figure 4B:
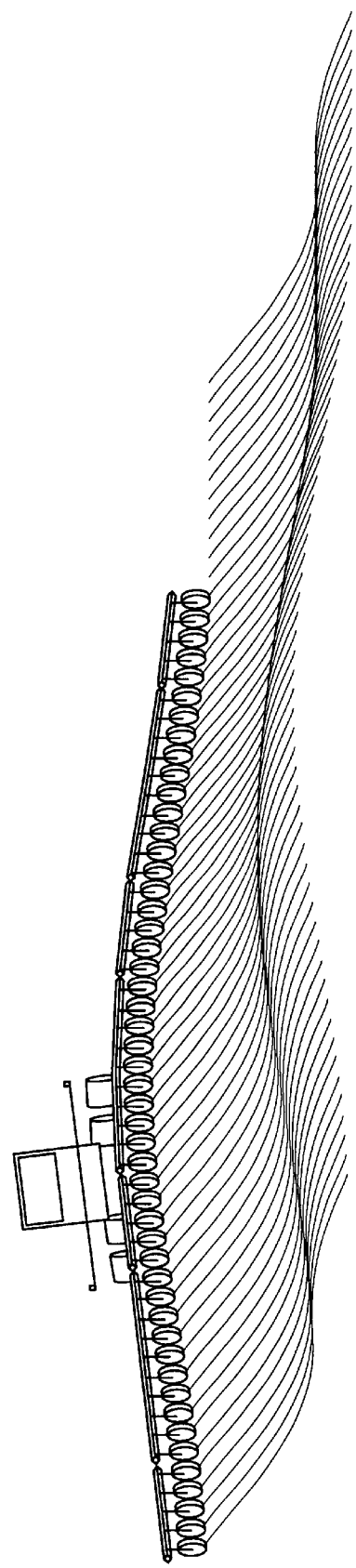
FIG. 4B is a rear view of the cultivator in the field mode.

Referring to the drawings, it is possible to observe the major elements and general operation of the present invention. Left and right references are used as a matter of convenience and are determined by standing at the rear of the tillage device or cultivator and facing the forward end in the normal direction of travel when the tillage device or cultivator is operating in the field (field mode, see FIG. 4B). Likewise, forward and rearward are determined by normal direction of travel in the field mode of the tillage device or cultivator. Upward or downward orientations are relative to the ground or operating surface. Horizontal or vertical planes are also relative to ground.

Figure 1:
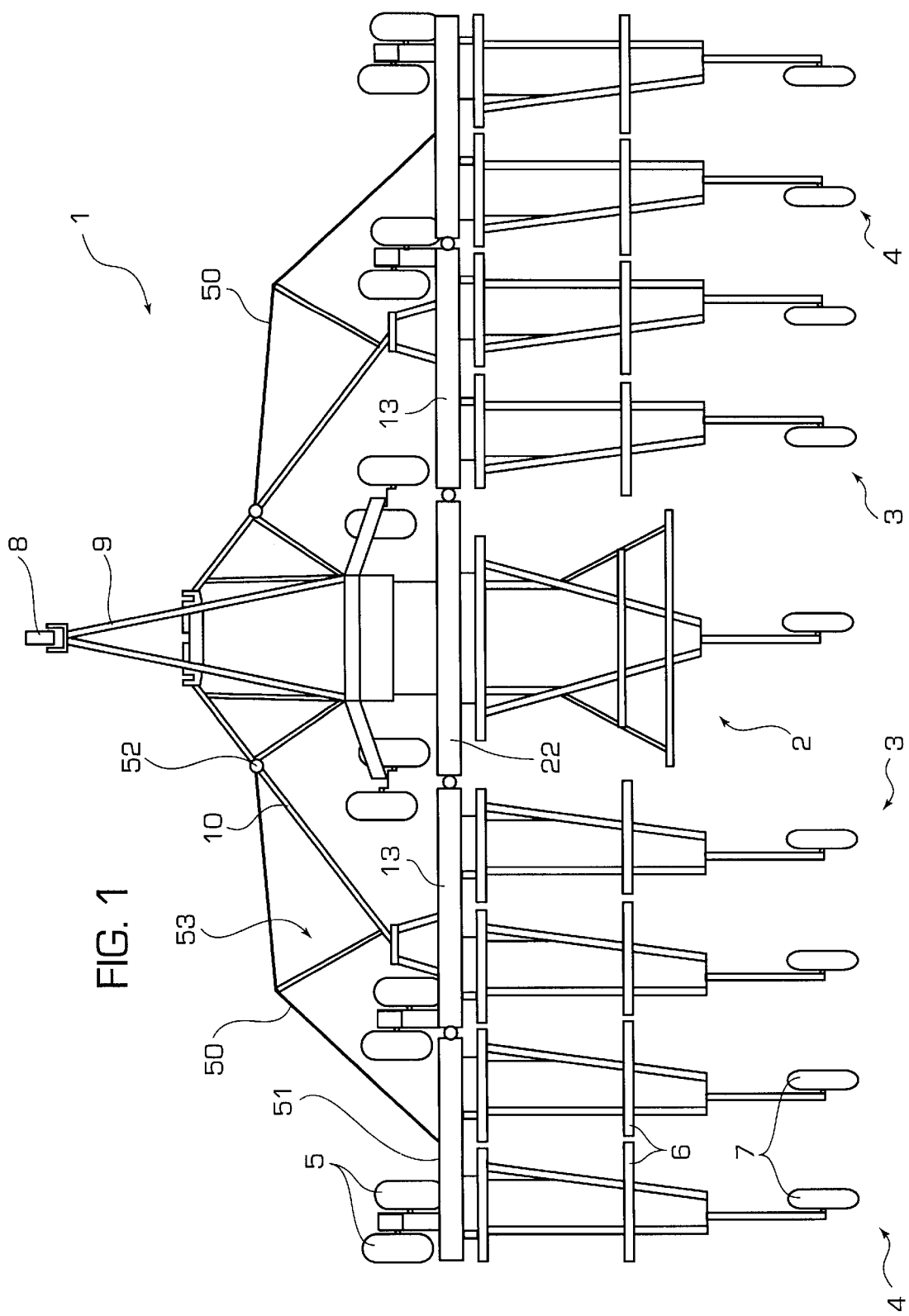
FIG. 1 is an overhead schematic view of the present invention.

FIG. 1 illustrates a general overhead view of the pull-type tillage device or cultivator that the present invention is located. A conventional tillage device or cultivator consists of a center section 2 with two inner wings 3 positioned next to the center section 2. Next to the inner wings 3 are the outer wings 4. The tillage device or cultivator 1 has a triangular shaped center frame hitch 9. The base of this hitch 9 is ultimately attached to the center section 2. The front of the hitch 9 is attached to a tractor mount 8. The tractor mount 8 is attached to a conventional agricultural tractor. The tractor pulls the tillage device or cultivator 2 and also supplies hydraulic power or mechanical power via the power-take-off (pto) to the various implements on the cultivator 2. Supplementing the center frame hitch 9 is the wing hitch frame 10 that provides draft support to the inner wings 3. Supporting the entire cultivator 2 are a series of castor wheels 5 (located towards the front of the cultivator 2) and a series of packing or rear supporting wheels 7 (located towards the rear of the cultivator 2). The center section 2 has a center frame 22 and a toolbar 6. The toolbar 6 supports various ground-working implements. Such implements are well known in the art and include plows, coulters, discs as well as other implements. Each inner wing 3 and outer wing 4 also possesses a tool bar 6. The inner wing 3 also has an inner wing frame 13. The center frame 22 and inner wing frame 13 are connected by means of a universal joint assembly 21 that can best be seen in FIGS. 2 and 3. FIG. 1 shows the cultivator 2 in the field mode. In the field mode, the inner and outer wings 3 and 4 are fully extended horizontally across the field. There is also a headland mode (see FIG. 4A) where the wings (2 and 3) are still extended, but the tool bars 6 are raised out of the soil. The headland mode is used at the end of a crop row when an operator wishes to turn the tractor and cultivator 2 around and partially raise the ground working implements. The transportation mode (see FIG. 4C) involves rotating the center frame 22 and inner wing frame 13 upwards for 90 degrees. This rotates the toolbars 6 and packing wheels 6 up into the air. The wings 3 and 4 are rotated rearwards. This results in a cultivator that is narrow and may be transported to another field. The draft support wire 50 can best be seen in FIG. 1 and extends from the wing hitch frame 10 to the outer wing 4. During field operations, this wire can transfer some of the draft force in the outer wing 4 to the center hitch frame 9.

Figure 2:
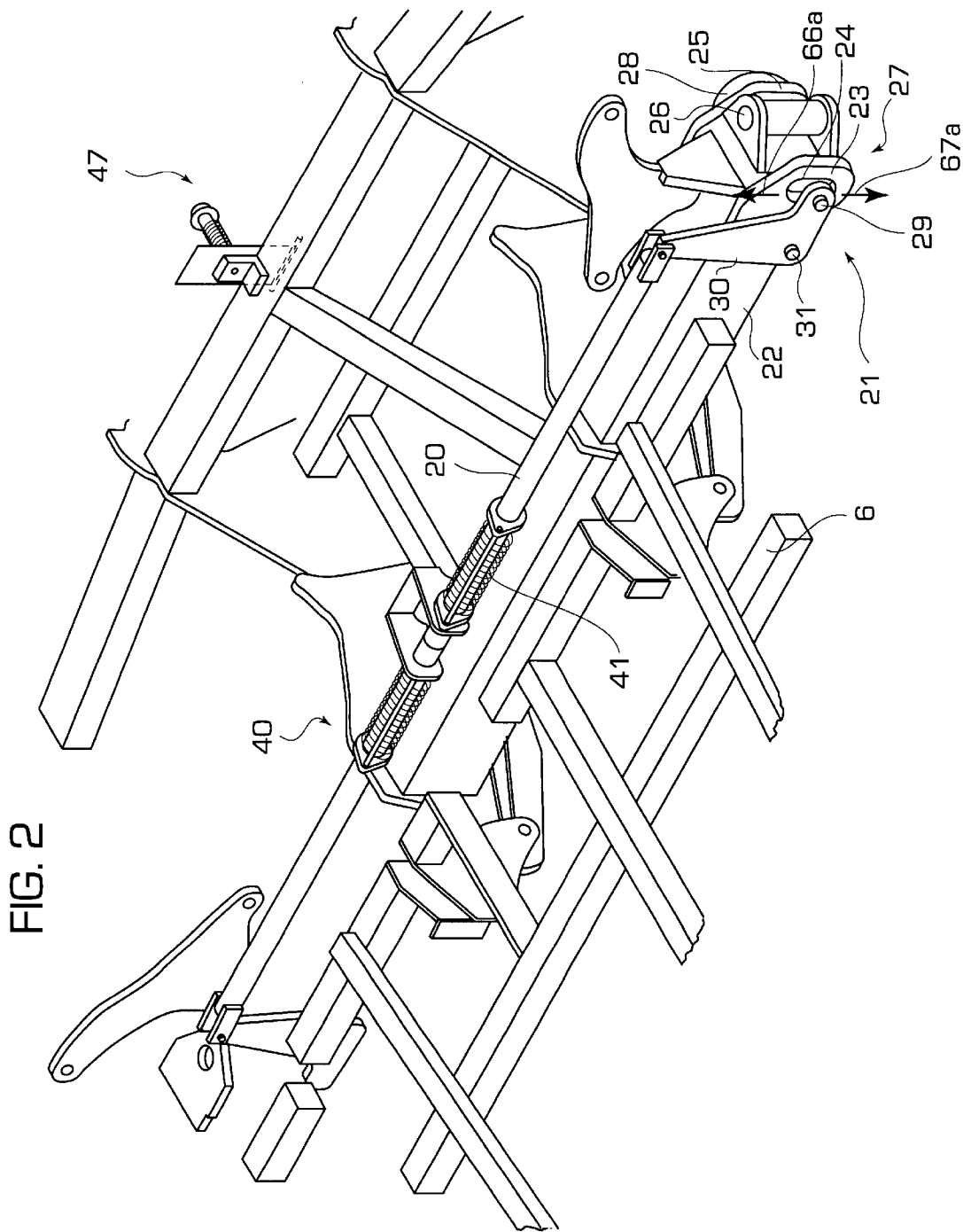
FIG. 2 is a side, overhead view of the differential control bar in the field mode.
Figure 3:
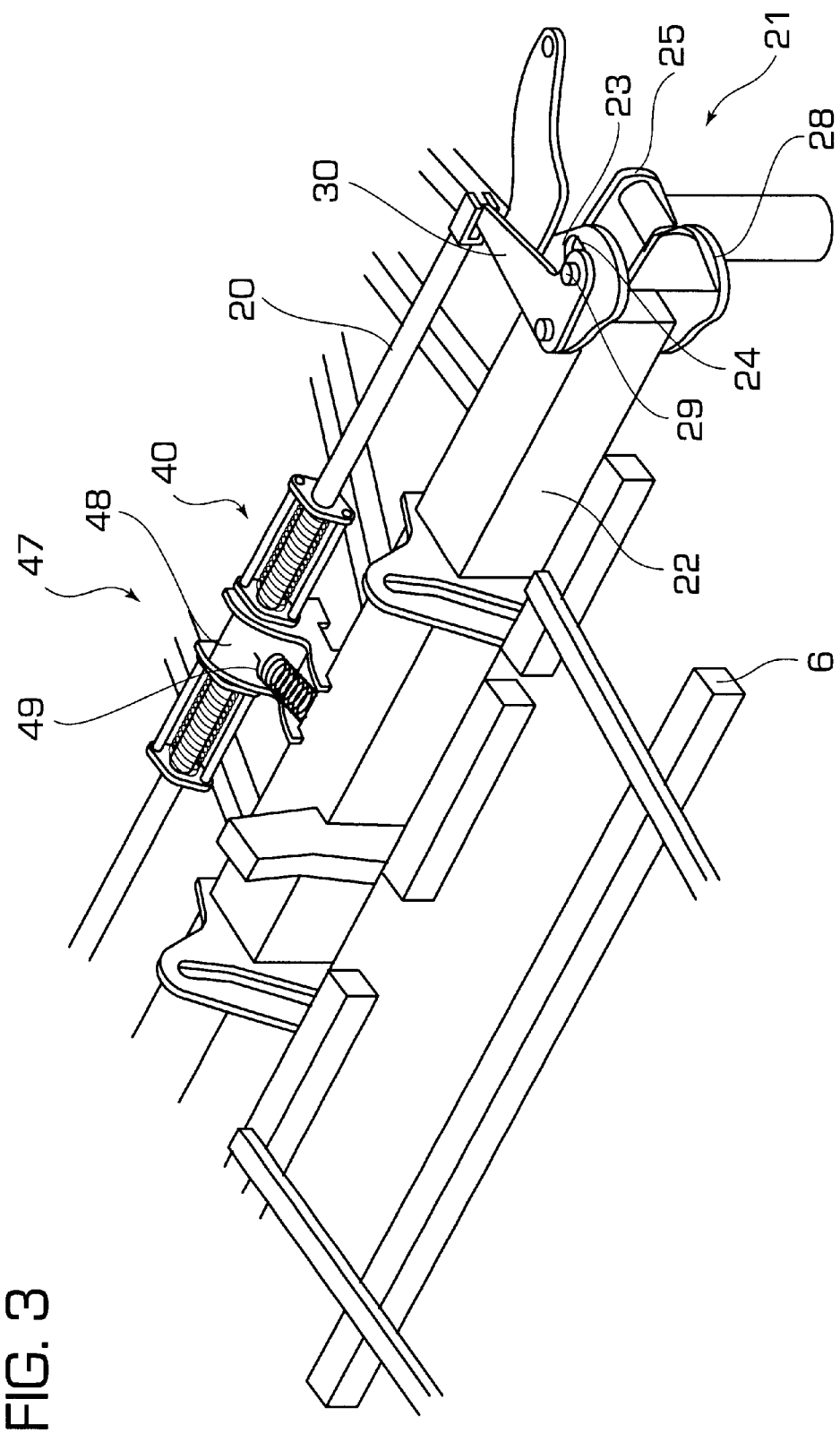
FIG. 3 is a side, overhead view of the differential control bar in the transport mode.
Figure 4C:
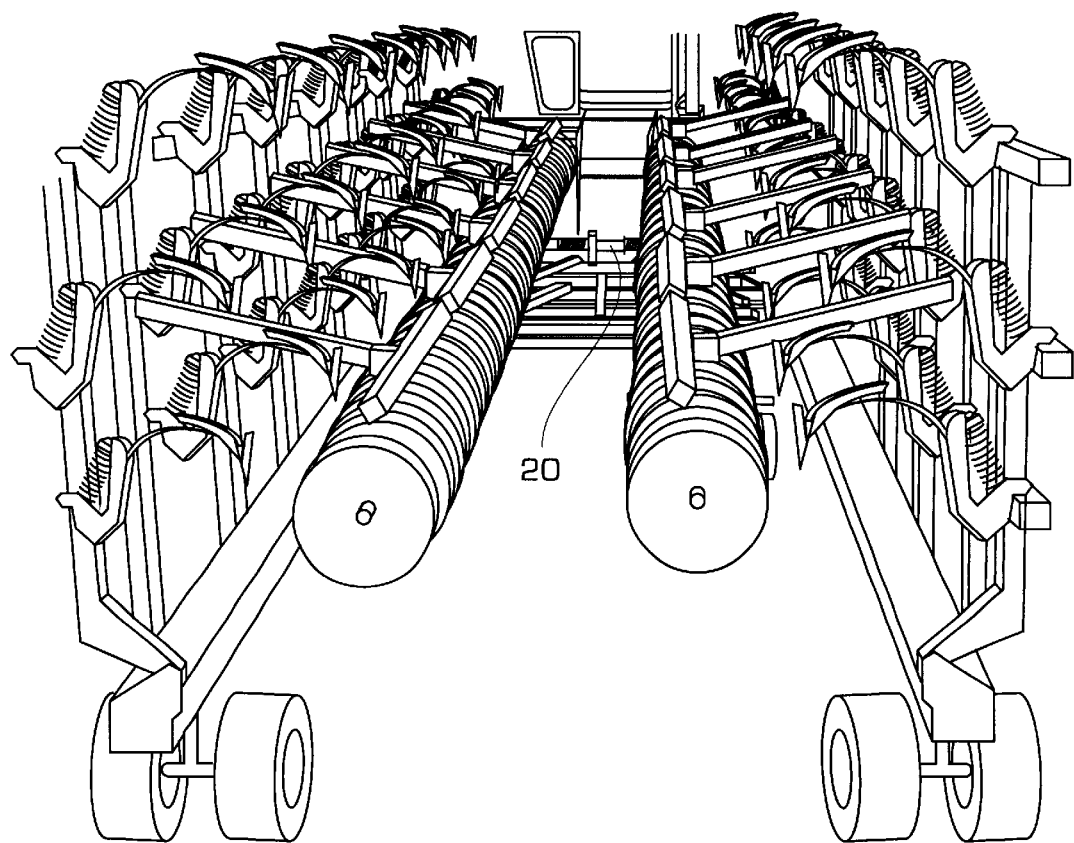
FIG. 4C is a rear view of the cultivator in the transportation mode.
Figure 4E:
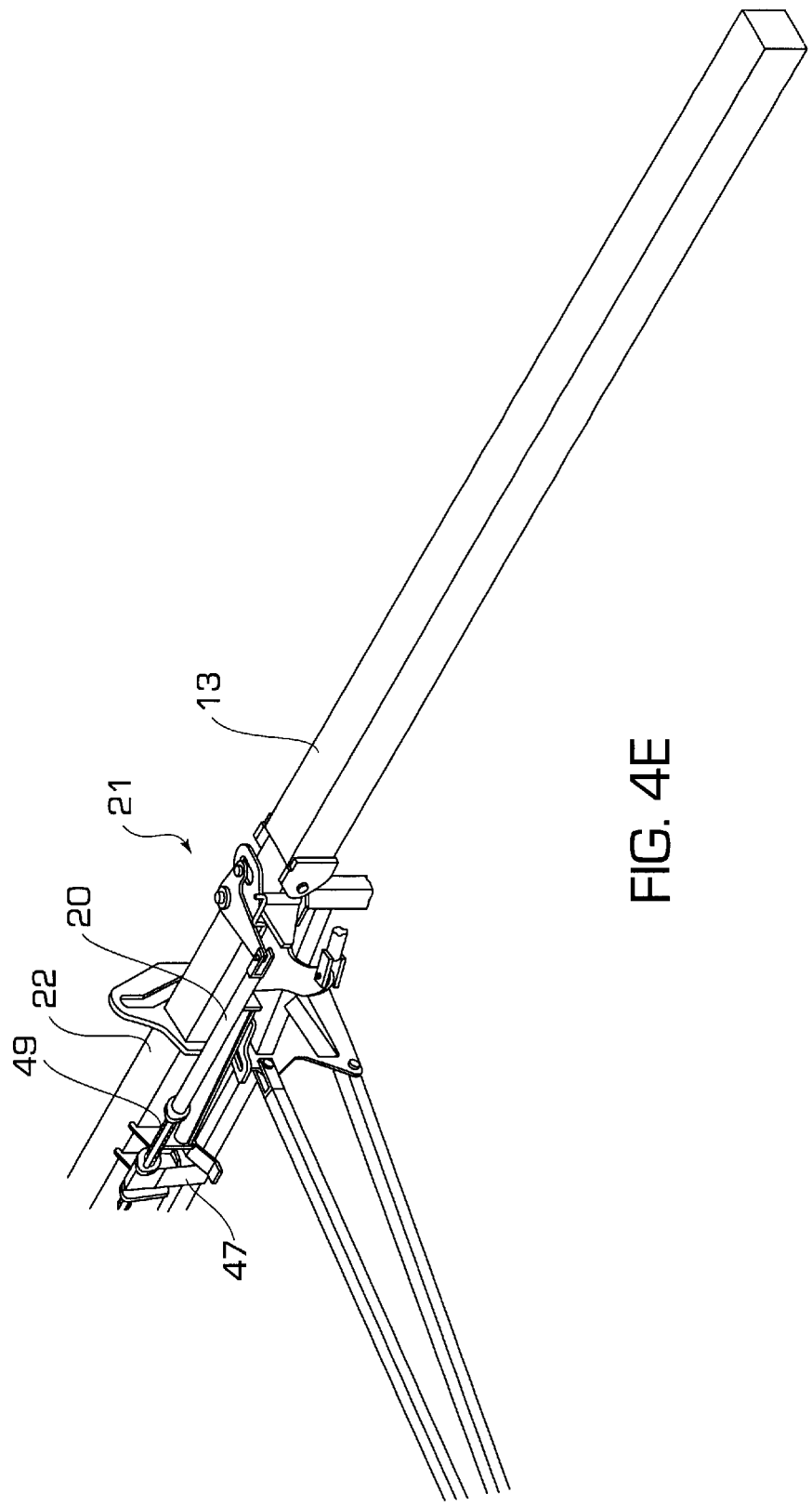
FIG. 4E is a side, front view of the differential rod while the cultivator is field operating mode.

As seen in FIGS. 2 and 3, the differential connecting rod 20 is located parallel to the center frame 22. It controls the movement of the universal joint assembly 21. There are two, identical connecting rods 20 which each control the universal joint assembly 21 located on the left and right sides of the center frame 22. For purposes of brevity, only the right side is illustrated and discussed. However, the left side works in an identical fashion. The universal joint assembly consists of a universal joint 25 with a center frame attach 27 and a wing attach 26. Generally speaking, the center frame 22 is connected to the center frame attach 27 and the wing frame is connected to the wing attach 26. FIG. 2 shows the center frame 22 and universal joint assembly 21 oriented in the field mode. FIG. 3 illustrates the center frame 22 and universal joint assembly 21 rotated forward 90 degrees into the transportation mode. Connecting the universal joint assembly 21 to the center frame 22 is bracket 23 with a slot 24. At the other end of the universal joint 25 is a conventional spherical bearing 28. The spherical bearing 28 allows for a full range of motion. This permits the universal joint 25 to move in the slot 24. This allows the wing section a full range of motion about the universal joint. Previously, the wing section could only rotate about an axis in the direction of travel. Now, the wing section can rotate upwards or downwards on an axis perpendicular to the direction of travel and about a vertical axis. However, to control the movement of the universal joint 25 within the slot 24, there is the differential control bar 20. The universal joint assembly 21 has 3 axes of motion. The 3 axes joint consists of a universal joint with one joint pin connected to a yoke on the center frame 22 at bearing 28 at one end and constrained in slot 24 at the other end, defining a 1st axis longitudinal to the pin and a 2nd axis perpendicular to the pin through the bearing 28. The pin is allowed freedom to rotate about the 2nd axis within the limits of the slot 24 of the bracket 23. The 2nd axis is therefore generally transverse. A 3rd axis is defined by the joint pin connected to a yoke on the wing frame, which is perpendicular to the 1st axis and is a pivot for inner wings to follow ground elevations when in transport. The 1st axis in the transport position allows rear folding of the wing frames and in the field position is a pivot allowing wings to follow ground elevations as shown in FIG. 2. The 1st axis allows rear folding of the wing frames. The 2nd axis allows the drawbar to rotate relative to the center section so that the attached gangs are on average, aligned with the pitch of the ground (rising or falling slope in the direction of travel). The range of the 2nd axis rotation is limited by the ends of the slot 24.

Figure 5:
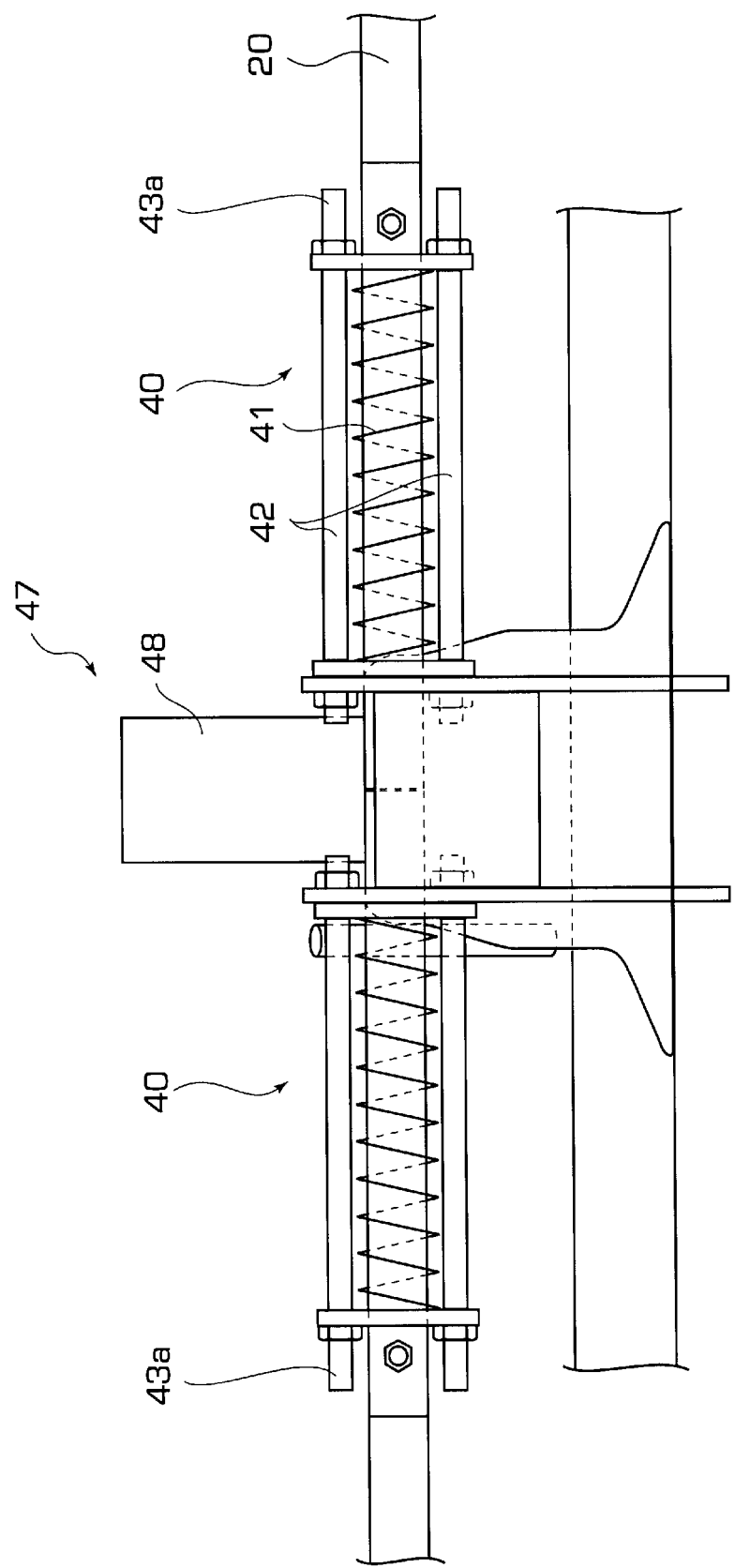
FIG. 5 is a front view of the differential control bar, showing both spring assemblies.
Figure 6:
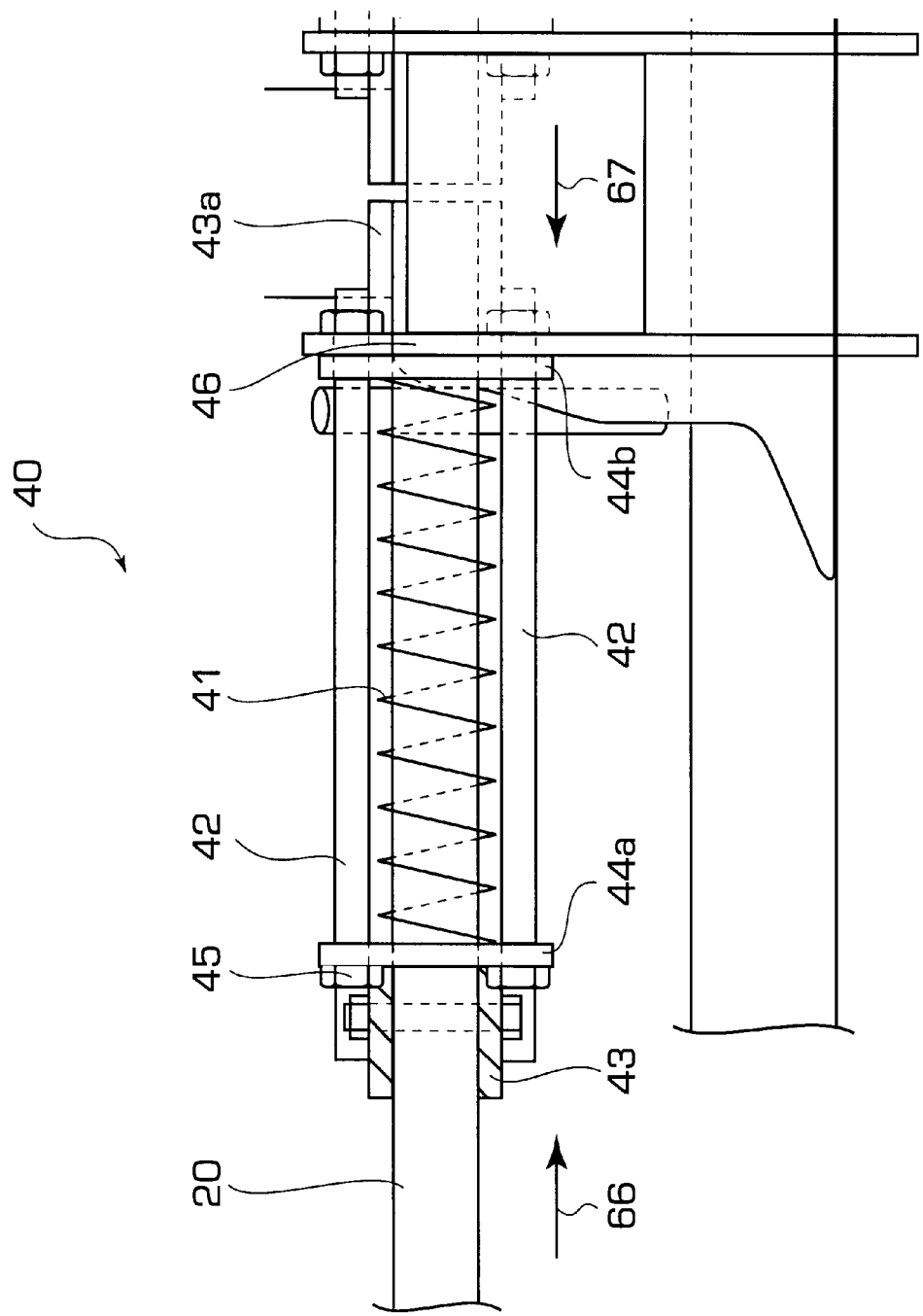
FIG. 6 is a front view of the left side of the differential control bar showing a single spring assembly.

In FIG. 2, the differential control bar 20 is attached towards the center of the center frame 22 by means of the spring assembly 40. The spring assembly 40 will discussed later. At the end of the center frame 22, the control bar is pivotally attached to an 'L'-shaped linkage 30. The 'L'-shaped linkage is pivotally attached to the center frame 22 at the linkage pivot 31. The end of the 'L'-shaped linkage 30 is attached to the universal joint assembly 21 at the pivot 29. Turning to FIGS. 5 and 6, it is possible to observe both spring assemblies 40. As previously indicated both spring assemblies 40 are identical in construction and operation. FIG. 6 illustrates a single spring assembly 40 viewed overhead. Each spring assembly 40 consists of a co-axial spring 41 held in a slightly compressed positioned by a pair of threaded tie rods 42. The differential tie rod is in 2 parts that, in field operation abut each other at the center of the center frame section. Each part 20 is slidably supported by a inner stop block 46 which is attached to the frame 22. The differential tie rod is biased to a central position as shown by a spring assembly 40. The spring assembly 40 is attached at one end to the inner stop block 46 by tie rods 42. The spring is co-axial with the differential tie rod 20. It is constrained between 2 abutment inner sliding blocks 44a and 44b. Inner sliding block 44a is constrained by nuts 45 at the end of tie rods 42. A pair of outer sliding blocks 43a are attached to the differential tie rod 20 (secured by bolt shown) and are in abutment with an inner sliding block 44a. Another pair of outer sliding blocks 43b are welded to the differential tie rod 20 and are in abutment with inner sliding block 44b, passing through the inner stop block 46. In operation, when a wing rotates about the 2nd axis in direction 66a, driven to an average position between the attached gangs as the ground slope varies, then it drives the L-shape lever and then the tie rod in direction 66. The spring is compressed between the outer sliding blocks 43a and the inner stop block 46, between which are also pressed inner sliding block 44a and 44b. The motion is directed onto the other abutting tie rod and causes the opposite wing to rotate about it's 2nd axis in an equal amount in the opposite direction. Therefor the center section is suspended at an average height between the 2 adjacent wing sections.

When being driven from the other wing section, the tie rod is forced in the other direction 67. Outer sliding blocks 44b about onto the inner sliding block 43b. The spring shown in FIG. 6 is then compressed between the outer sliding blocks 43b and nuts 45, between which is again pressed the inner sliding blocks 44b and 44a. The spring works in both directions to bias the ½ of the tie rod assembly to a central position. The other ½ assembly works the same way. The height of center section is driven by the 3 axes joints attaching the wing frames on either side. The differential tie rod assembly keeps it at an average position between the 2 wing frames and biases the wing frames into rotational alignment with the center frame about the 2nd axis. It also distributes weight transfer force that may be optionally applied to the center frame onto each of the wing frames. It should be noted that there are several possible secondary embodiments involving the tie rods.

When the cultivator 2 is in the transportation mode, as seen in FIG. 3, it is important the pivot 29 be fixed in the slot 24. Because the wing section's weight is support partially by the universal assembly 21, it is important the pivot 29 not impact the slot 24. To achieve that goal, a transport assembly 47 has been included to prevent the differential rod from translation. The transport assembly 47 has a tongue 48 attached to the center frame 22. A tongue spring 49 is biased between the differential rods 40 as seen in FIG. 3. During the transition from the field mode (as seen in FIG. 2) to the transportation mode (as seen in FIG. 3), the wings are folded upwards 90 degrees and the ends of the wings are folded rearwards. This places a force similar to 67a on the pivot 29. These forces pull both differential bars 20 away from the center of the center frame 22. The spring-biased tongue 49 is inserted between the rods when the center frame 22 is rotated forward 90 degrees. This locks the rods and holds the pivot 29 at one end of the slot 24 during transport (as seen in FIG. 4D). Conversely, the tongue 48 is removed from between the rods when the center frame 22 is rotated into the field position.

Figure 4F:
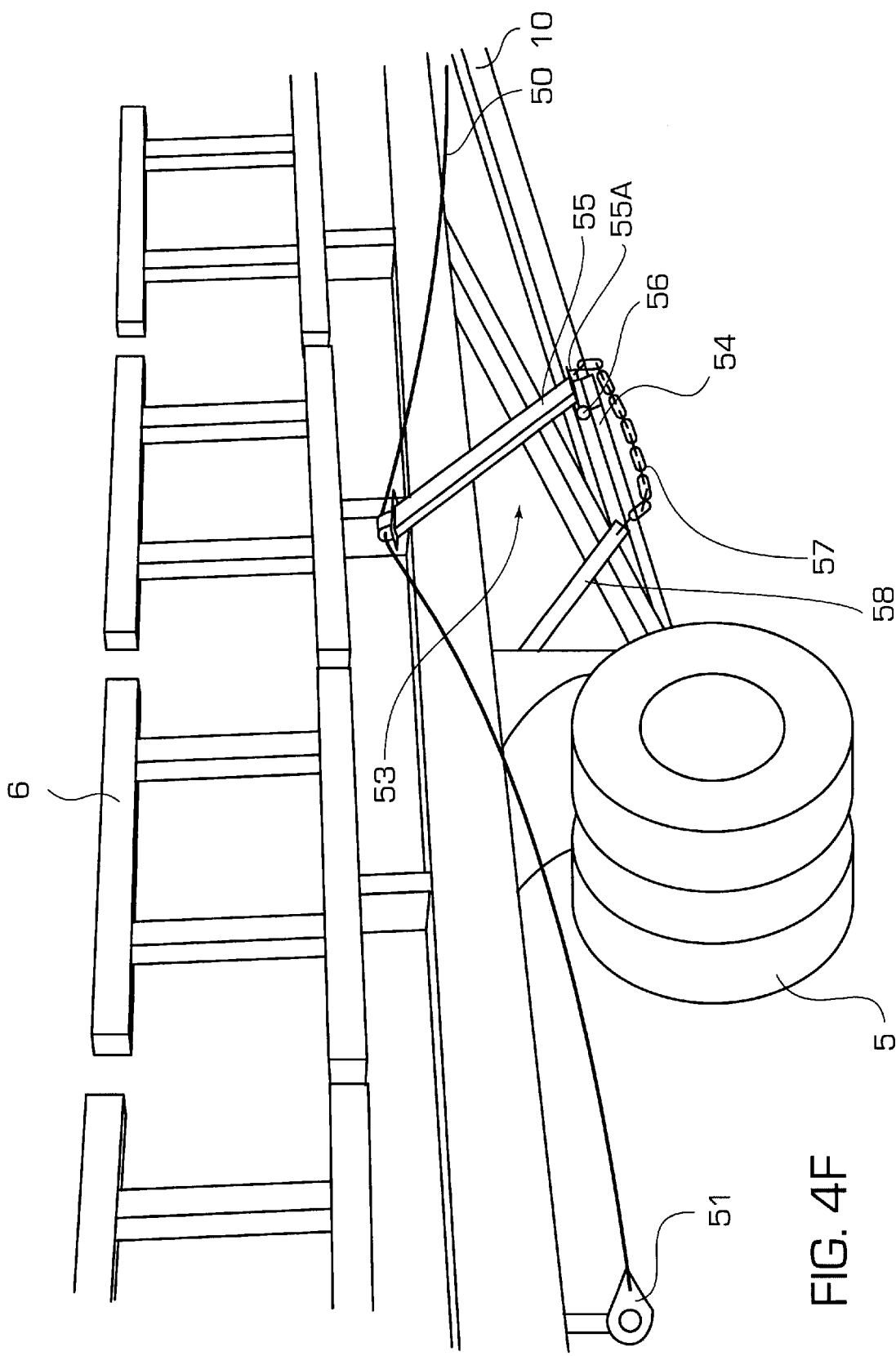
FIG. 4F is a view of the folding support wire when the cultivator is in the transportation mode.

The folding draft support wire 50 can be seen in FIGS. 1 and 4F. The wire 50 is attached to the cultivator 2 at three points. The wire 50 is pivotally attached to the wing hitch frame at 52. At the opposite end, the wire 50 is pivotally attached to the outer wing hitch at 51 (see FIG. 4F). Supporting the wire 50 in the middle is the folding support arm 53. The folding draft support wire 50 is designed to transfer the draft force created by the outer wings to the center hitch frame. Failure to transfer the draft force could result in the outer wings twisting behind the center section. As seen in FIG. 4F, the support wire 50 is lifted towards the center frame and wing sections during the transportation mode. The folding support arm 53 accomplishes this. The folding support arm 53 consists of an inner arm 54 attached to the wing hitch frame 10. A hinge 56 pivotally attaches the outer arm 55. To ensure that the support arm 53 remains fully extended during the field mode, the outer arm 55 has an elongated plate 55a. Attached to the elongated plate 55a is a chain 57. The chain is connected to the wing hitch frame 10 by a pivotally mounted chain arm 58. The support wire 50 is attached to the top of the outer arm 55. During the field mode, the wing hitch frame 10 is rotated 90 degrees downwards. The chain arm 58 pulls the elongated plate 55a and outer arm 55 away and downwards. This extends the draft wire 50. Conversely, when the converting the cultivator from the field mode to the transport mode, the wing hitch frame 10 rotates upwards 90 degrees. This allows the outer arm to pivot about the hinge 56. The wire is moved towards the hitch frame as seen in FIG. 4F. It is the tension in the wire as the wing frames are folded rearwardly that causes the wire to be pulled in close to the frame in the transport position. The outer arm guides the position of the wire up and over the wheel so it does not rub on the wheel or the ground in transport.

It will be obvious to those skilled in the art that various changes may be made without departing from the scope of the invention and the invention is not to be considered limited to what is illustrated in the drawings and described in the specification.

What is claimed is:

1. In an agricultural implement having support wheels and adapted to be pulled by a tractor, said implement comprising:

a central frame with a front end and opposing sides and having a hitch frame affixed at said front end to said central frame adjacent said front end thereof and extending away therefrom in a first direction and terminating at the other end with a hitch for attachment to said tractor;

a pair of substantially identical, but reversed, wing frames with front ends, one connected to each side of said central frame at the front ends thereof, the connections between said wing frames and said central frame permitting said wing frames to be selectively moved from an operating position to a transport position by rotating about said front ends thereof 90° in said first direction and 90° in a second direction transverse to said first direction toward the respective side of said central frame, the improvement on each side of said central frame comprising:

a draft support wire connected at one end to said hitch frame and connected at the other end to said wing frame at the front end thereof;

a support arm pivotally attached at one end to said wing frame at a position closer to said central frame than the position of connection of said support wire to said wing frame and attached to said support wire along the length thereof at the other end, the length of said support arm such that in said operating position said support wire does not form a straight line between the points of connection with said frames;

said support arm and wire pivotable between said operating position where said support wire is taut and transfers draft forces between said wing frame and said hitch frame, and said transport position where said support wire is not taut and is held in position away from components operable in the transport position.

2. The improvement of claim 1, further including:

a mechanical mechanism for pivoting said support arm between said operating and transport positions;

said mechanism interconnecting said support arm and said wing frame such that movement of said wing from into said transport position causes said mechanism to pivot said support arm into said transport position and movement of said wing frame into said operating position causes said mechanism to pivot said support arm into said operating position.

3. The improvement of claim 2, wherein: said mechanism is a chain connected on one end to an elongate control arm affixed to said wing frame and on the other end to said support arm.

4. The improvement of claim 3, wherein: said support arm is connected to said wing frame by a hinge.

5. The improvement of claim 4, further including: an elongated plate affixed to said pivot arm and said chain is connected thereto.

* * * * *